(12) United States Patent
Edevold et al.

(10) Patent No.: US 6,292,379 B1
(45) Date of Patent: Sep. 18, 2001

(54) DISTRIBUTED INTERNAL FAULT BYPASS IN A MODULAR UNINTERRUPTIBLE POWER SUPPLY

(75) Inventors: Craig Edevold, Tomah; Cary Winch; Donald K. Zahrte, Sr., both of Necedah; Joseph R. Wade, Mindoro; Peter Jungwirth, Wisconsin Rapids; Derek Laufenberg, Wauwatosa, all of WI (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/538,051

(22) Filed: Mar. 29, 2000

(51) Int. Cl.[7] ..................................... H02M 7/00
(52) U.S. Cl. ............................... 363/71; 307/66
(58) Field of Search ................... 363/71, 144; 307/66

(56) References Cited

U.S. PATENT DOCUMENTS

| | | | |
|---|---|---|---|
| 3,721,890 | * | 3/1973 | Ettinger et al. ................. 363/144 |
| 4,142,231 | * | 2/1979 | Wilson et al. .................. 363/141 |
| 5,764,504 | * | 6/1998 | Brand et al. ................... 363/144 |
| 5,982,652 | * | 11/1999 | Simonelli et al. ............... 363/142 |

* cited by examiner

Primary Examiner—Adolf Deneke Berhane
(74) Attorney, Agent, or Firm—Leydig, Voit & Mayer Ltd.

(57) ABSTRACT

A modular uninterruptible power supply is presented having multiple power modules installed therein. Each of the individual power modules contains an internal bypass circuit sized for its particular power module. Preferably internal bypass circuitry is sized to carry two per unit load. The system and method of the invention also includes internal control circuitry for each of the modular power modules that control transitions between the inverter and bypass modes of operation. This transition control is coordinated with the other controllers for the other modular power modules installed in the uninterruptible power supply. Both the high speed communication bus and a high level interrupt line are utilized to minimize the transfer break time between different modes of operation while ensuring that the inverter is never paralleled with the utility line voltage. To further minimize this transfer time, a solid state switching circuit is utilized to provide the initialization between operational modes. To maximize the efficiency during the bypass mode of operation, and electromechanical relay is utilized in coordinated operation with the solid state switching device to provide long-term power requirements during the bypass mode.

27 Claims, 6 Drawing Sheets

DISTRIBUTED INTERNAL FAULT BYPASS IN A MODULAR UNINTERRUPTIBLE POWER SUPPLY

FIELD OF THE INVENTION

This invention relates generally to fault bypass circuitry for power inverters, and more particularly to bypass circuitry for use in modular uninterruptible power supply systems.

BACKGROUND OF THE INVENTION

As more and more segments of the business environment enter the information age, more and more computers and computing power are required. As businesses move from the old to the new economy their reliance on the processing, transference, and storage of digital information is becoming a more and more critical aspect of their overall business strategy. While in the past, computer crashes were seen as a mere nuisance, the loss of computing power and business data may well devastate a business's ability to survive in today's new economy. As such, the need for reliable, uninterruptible electric power to maintain the operational status of the computing equipment and the integrity of the digital data continues to rise.

To meet these requirements, uninterruptible power supplies (UPS) have been developed that utilize a bank of electric storage batteries and solid state conversion equipment. These UPSs operate in association with the utility line voltage to provide continuous electric power to a business's computer systems in the event of a loss or deviation of power from the utility. The number of batteries contained within an UPS is dependent upon the business's length of time that it needs to operate in the event of a utility power system failure. Likewise, the number of power inverters included in an UPS is dependent upon the overall total system load required to be supplied thereby. In the past, uninterruptible power supplies were only available in discrete sizes. However, with the recognition of the various requirements from the multitude of businesses that require UPSs, the development of modular uninterruptible power supplies has provided a flexibility heretofore unknown. Now, a business's UPS power output may grow as its business needs, without requiring the purchase of additional redundant hardware and control boards as in the past.

In addition to the batteries and power inverters, uninterruptible power supplies also have a requirement for the inclusion of fault bypass circuitry that allows the output loads to be supplied directly by the utility line power once activated. Such bypass circuitry is needed to protect the electronic switches of the power inverter in the event that the output load current draw exceeds the maximum rating of the inverter. Additionally, this circuitry may be activated in the event that a failure within the power inverter is detected by the control circuitry such that the output loads may continue to receive electric power. Under the prior paradigm where uninterruptible power supplies were constructed and sold in a given, fixed, maximum output power capacity, these output circuits were properly sized to handle the rated load of the inverter.

However, as modular UPSs 11 were designed, such as illustrated in FIG. 6, the output bypass circuitry 17 continued to remain a core circuit element within the UPS chassis. As such, it needed to be sized for the maximum configurable power output capacity of the entire modular UPS, regardless of the actual configuration for a particular customer. This ensured that the modular UPS 11 would be able to handle the bypass current requirement for a maximum output power configured UPS, assuming that a customer had installed the maximum number of power inverters 13 supported. Unfortunately, for customers who do not have this maximum power capacity installed (illustrated by empty slots 15a–c), they were still forced to pay the cost for the larger rated circuitry 17. While such additional cost is acceptable to a business that needs its bypass capacity, the additional cost is hard to justify to a customer who may never utilize such high power output.

Further, prior non-modular UPSs had to coordinate operation only between a single inverter and the output bypass circuitry. Therefore, there was no design concern with respect to differential switching of paralleled inverters as is the case with modular UPSs. That is to say, in prior systems the bypass control circuitry needed to only shut-off one inverter before operating the bypass circuit. In many of these UPSs, the output of the inverter was coupled to the loads through a ferroresonant transformer. As such, there was little concern as to the short period between the turning off of the inverter and the turning on of the bypass circuit because the ferroresonant transformer would not reflect this short break in power during the transition therebetween.

Likewise, many modular UPSs also include ferroresonant transformer coupled outputs which also are not concerned with short breaks in power during the transition from the inverter output to the utility line voltage. Since each of these systems could rely on the output power characteristics of the ferroresonant transformer, these prior systems provided the bypass circuitry function by using a simple mechanical relay to bypass the inverter. Unfortunately, these known methods are inapplicable to modular uninterruptible power supplies that utilize transformerless inverters.

Therefore, there exists a need in the art for a new system of providing UPS bypass functionality without requiring that this circuitry be sized for the total output of the possible configuration of the modular UPS chassis, and that is able to operate with transformerless inverters.

SUMMARY OF THE INVENTION

A method and circuitry for supplying bypass functionality in a multiple module uninterruptible power supply (UPS) is presented. In accordance with a preferred embodiment, this is accomplished by distributing the bypass functionality into each of the power modules in the modular UPS, thereby allowing the bypass capacity to increase as the power rating of the system increases due to the addition of additional power modules. This bypass capacity is therefore proportional to the rating of the installed power modules, unassociated with the potential power rating of the UPS chassis. As such, the circuitry and method of the preferred embodiment reduces the required bypass circuitry's capacity on the system with lower than maximum power requirements, thereby reducing costs on those systems. Additionally, the circuitry of the invention provides redundant bypass circuitry that increases the fault tolerance of the installed system by allowing continued operation in the event of a failure of one of the bypass circuits.

In an embodiment of the invention for a modular uninterruptible power supply, where there is a system failure or the load requires more current than the installed inverters can supply, the UPS transfers the power from the utility source, directly to the load, bypassing the UPS inverters. Further, the circuitry of the invention allows user control to bypass the inverter stages during operation for increased efficiency, servicing, etc.

In a preferred embodiment, an uninterruptible power supply includes a chassis with installable power modules.

Each power module added to the system increases the total power rating of the system by the power rating of the individual module. Each power module has circuitry that enables the power module to bypass its inverter circuitry in a controlled manner. This control is provided by circuitry and software for detecting a condition requiring the bypass mode of operation. When one power module detects such a condition, it sends a signal to the other power modules that then, in a coordinated fashion, all switch themselves into bypass mode.

In a preferred embodiment, the module's bypass circuitry is designed to carry bypass current equal to two modules on the UPS. This allows for the continued operation of a system in bypass mode of operation in the event that one of only two installed modules running at maximum capacity is suddenly removed either by the user or due to failure. In the preferred embodiment, the remaining module will be able to sustain the full load in the bypass mode of operation.

In a preferred embodiment wherein the power modules utilize transformerless power inverters, the instant invention ensures tight synchronization of the UPS state change to allow them to function as a collective system. The bypass relay control transition is accomplished nearly simultaneously on each power module in the system by controlling state changes with tight timing on the execution skew between power modules. This is accomplished in a preferred embodiment by including a shared logic line and a high-speed communications bus to accurately synchronize actions and events between a collection of UPS subsystems. While high-speed buses provide an excellent means of triggering actions, microsecond synchronization of actions on two different processors is difficult due to the asynchronous nature of the communications. Typically, communication latencies and interrupt delays limit the accuracy to a few milliseconds. In a preferred embodiment, the addition of a common synchronization line tied to a high level interrupt on each of the subsystem's processors removes the communication variability.

Preferably, the procedure for synchronizing a command or event is accomplished by allowing a requester to take control of the shared logic line, having the requester send a state change command to all targets on the bus, readying all targets to perform the requested action based on the command, and having the requester toggle the shared logic line causing a high level non-maskable interrupt to execute on all subsystem processors. In this way, the synchronization line causes a high level or non-maskable interrupt on each of the target subsystems including the requesting subsystem. The actions across the multiple processors are all started at the same time within the limit of the processors ISR handling. This is typically only a few tenths of microseconds, which is much tighter than the communications would allow if used independently.

With such high speed coordinated control included in a preferred embodiment, the system of the invention provides paralleled solid state and electromechanical switches as the bypass circuitry for the included transformerless inverter for each module. In this way, the coordinated control can disable the inverter output and turn on the solid state bypass switch within a time approaching a single gate delay. As such, any break in power which results from this transfer between the inverter and bypass will be negligible, and certainly within the acceptable parameters of the utilization equipment's power requirements. Once this initial transition has taken place, the electromechanical relay is also triggered, and will close within a cycle or two of the output waveform, depending on its physical characteristics. The control provided by a preferred embodiment also allows for proper transitions from the bypass mode to the inverter mode of operation by reversing the above-described switching sequence.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
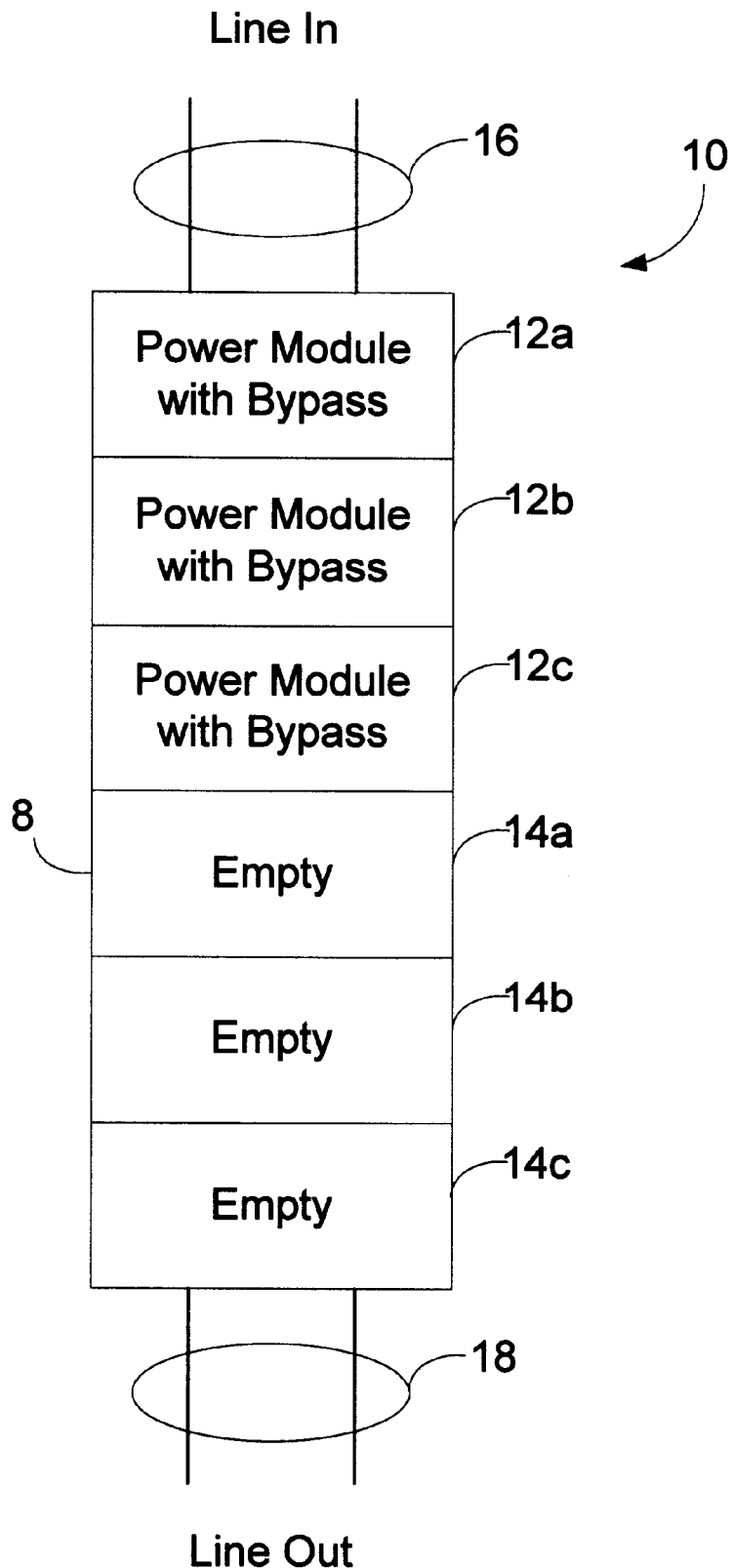
FIG. 1 is a single-line block diagram illustrating a modular uninterruptible power supply constructed in accordance with the teachings of the invention.

A preferred embodiment of a modular power supply having bypass capacity is illustrated in simplified system block diagrammatic form in FIG. 1. As may be seen from this FIG. 1, the modular uninterruptible power supply 10 includes a plurality of slots within its chassis 8. Three of these slots are filled with power modules constructed in accordance with the teachings of the invention 12A–C, and three are empty 14A–C allowing for future expansion should the business entity's needs require. As is typical with modular uninterruptible power supplies, the AC line voltage is coupled to the modular uninterruptible power supply 10 via lines 16. Depending on the particular internal configuration of the modular uninterruptible power supply 10, this AC line voltage from the utility may be passed directly by the bypass circuitry within each of the power modules 12A–C to the output lines 18 to provide a very high efficiency transfer of power. Alternatively, this AC utility line input power may be used to simply feed the inverters within each power module 12A–C. In this case, it is the output of the individual power inverters within each power module that supplies the output lines 18, and therefore the connected utilization equipment.

As will be recognized by one skilled in the art, most business enterprises will desire some period of operation of the uninterruptible power supply 10 during a complete loss of utility line input power on lines 16. Therefore, these enterprises will install a battery bank in at least one of the empty slots 14A–C of the uninterruptible power supplies chassis. The inverters within the individual power modules 12A–C will then utilize this battery power to generate AC output power on lines 18 for use by the utilization equipment. However, since the usage of batteries does not increase the total output power capability (total output power capacity being defined by the number in size of the individual power modules), the individual battery banks have not been shown for purposes of simplicity.

Figure 6:
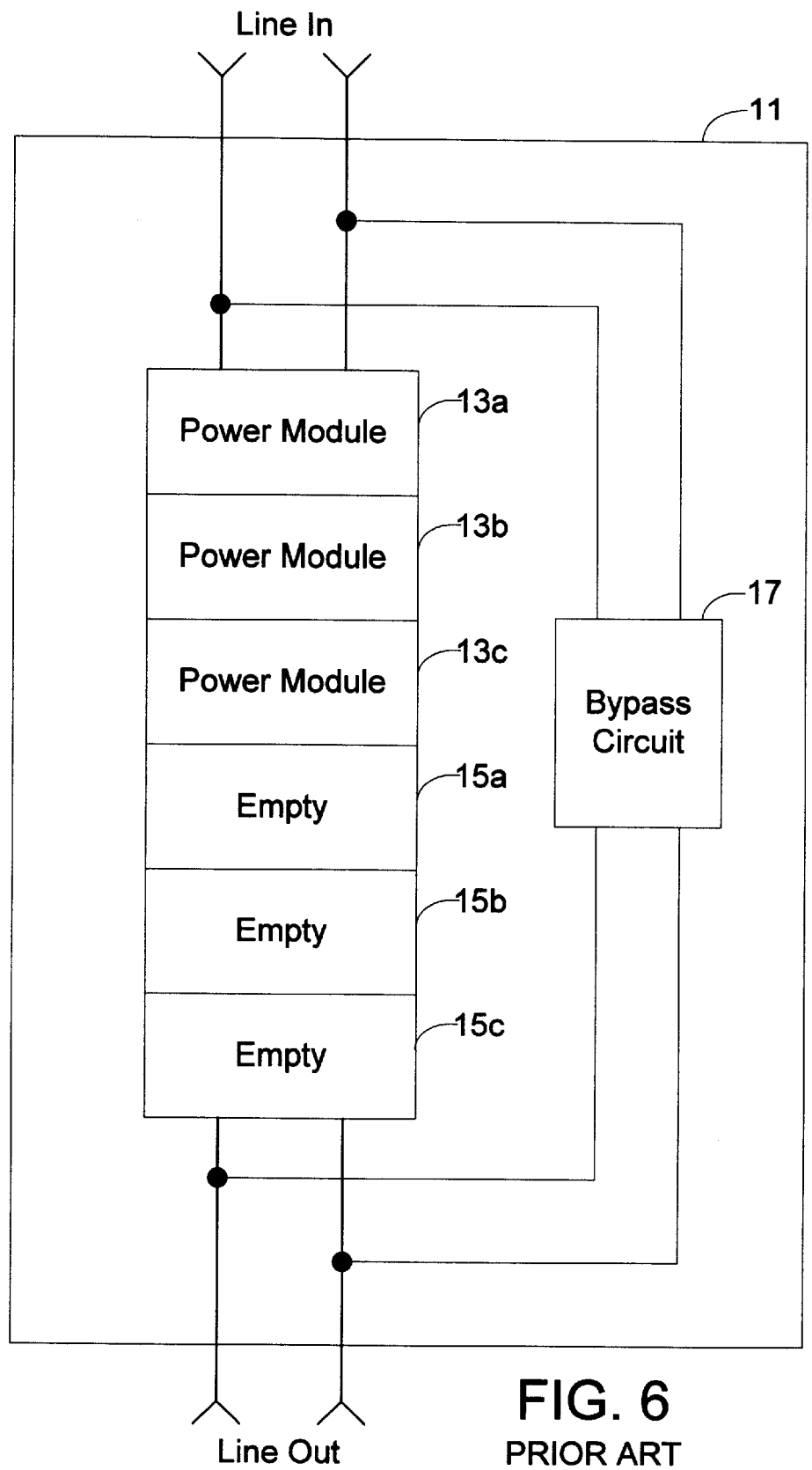
FIG. 6 is a system block diagram illustrating a typical modular uninterruptible power supply with a bypass circuit.

As will be clear from an analysis of this FIG. 1 in view of the foregoing description of the prior modular power supply design illustrated in FIG. 6, the modular uninterruptible power supply 10 of the invention does not require a separate bypass circuit resident in the chassis of the uninterruptible power supply that is sized for the maximum possible configuration of the modular uninterruptible power supply. Therefore, the business enterprise is not required to pay for excess bypass capacity based on their configuration of the modular uninterruptible power supply. Further, the modular uninterruptible power supply 10 of the invention does not require that a separate resident controller within the modular uninterruptible power supply chassis control the functioning and operation of the bypass circuitry. Instead, the operation of the bypass circuitry within each individual power module 12A–C is coordinated and controlled by its own internal controller as will be discussed more fully below. In this way, the overall modular uninterruptible power supply chassis costs may be reduced since the large bypass circuitry and its associated control is no longer required as part of the chassis 8.

Figure 2:
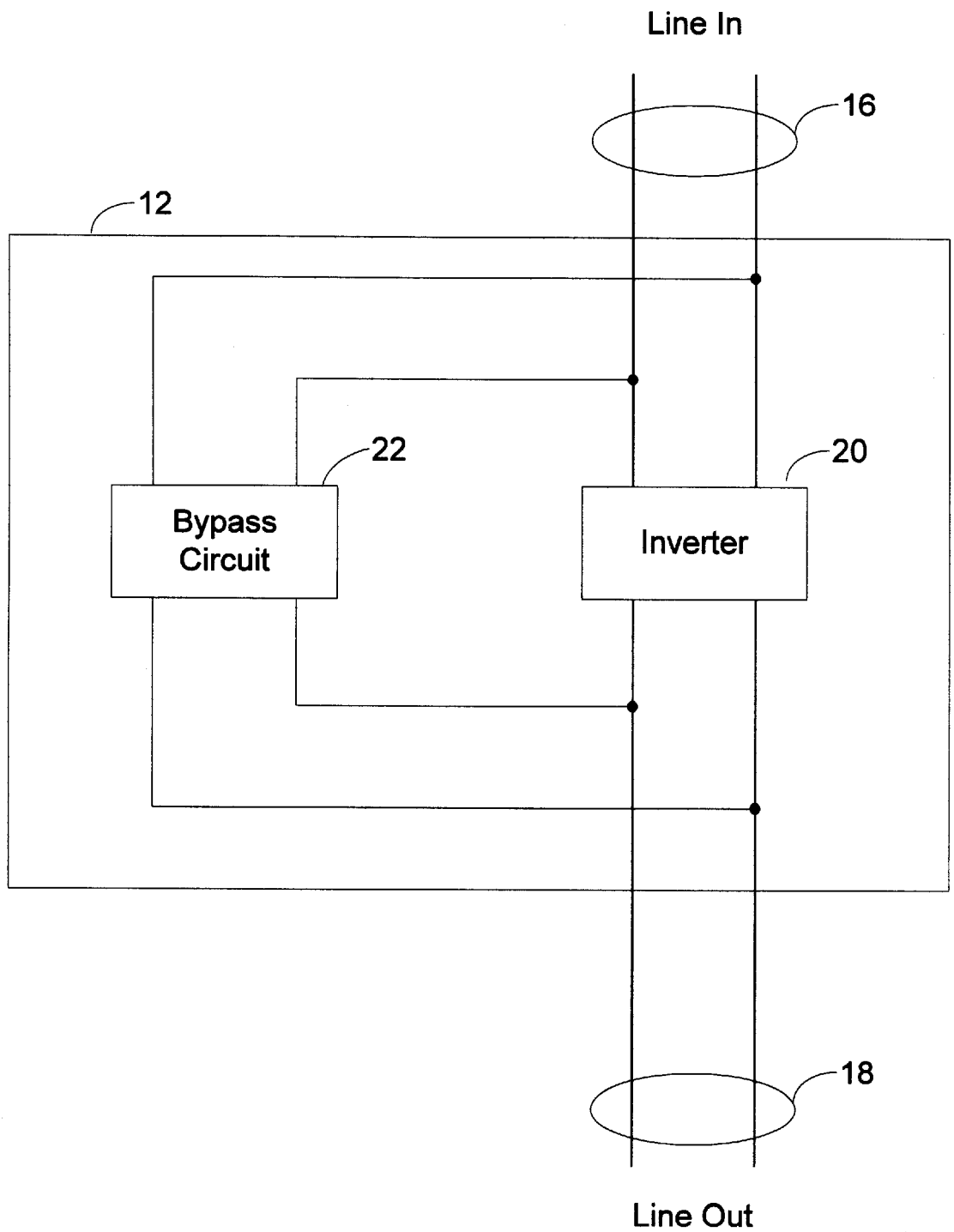
FIG. 2 is a simplified single-line block diagram of an embodiment of a power module suitable for use in the modular uninterruptible power supply of FIG. 1.

The basic structure of the individual power module 12 constructed in accordance with the teachings of the invention is illustrated in the simplified single line block diagram of FIG. 2. In its simplest sense, the individual power module 12 includes a power inverter 20 and a bypass circuit 22 that is sized and rated for the individual power module 12 as opposed to the overall system into which this power module may be installed. For example, the rating of the bypass circuit 22 will not change regardless of whether the power module 12 is installed in a three power module uninterruptible power supply such as that illustrated in FIG. 1, or a twenty-four power module uninterruptible power supply which may be required in a large business enterprise. While the actual rating of the bypass circuit 22 may be sized to be identical to the power rating of the inverter 20, a preferred embodiment of the bypass circuit 22 is sized for twice the rating of the inverter 20 to account for system overloads and a particular fault condition.

Specifically, in a situation where an uninterruptible power supply 10 only includes two power modules and they are each running at maximum capacity to supply the utilization equipment, if one of the power modules is removed either by the user or due to a catastrophic failure, the remaining power module will be able to sustain the full load by switching to the bypass circuitry 22. That is, the bypass circuitry 22 of a single power module is capable of supplying the output requirements of two inverters 20. This is the maximum worst case situation since any other configuration of a uninterruptible power supply having more than two power modules to start with results in lower power requirements for the remaining power modules 12 should one of the power modules be removed as described above.

Figure 3:
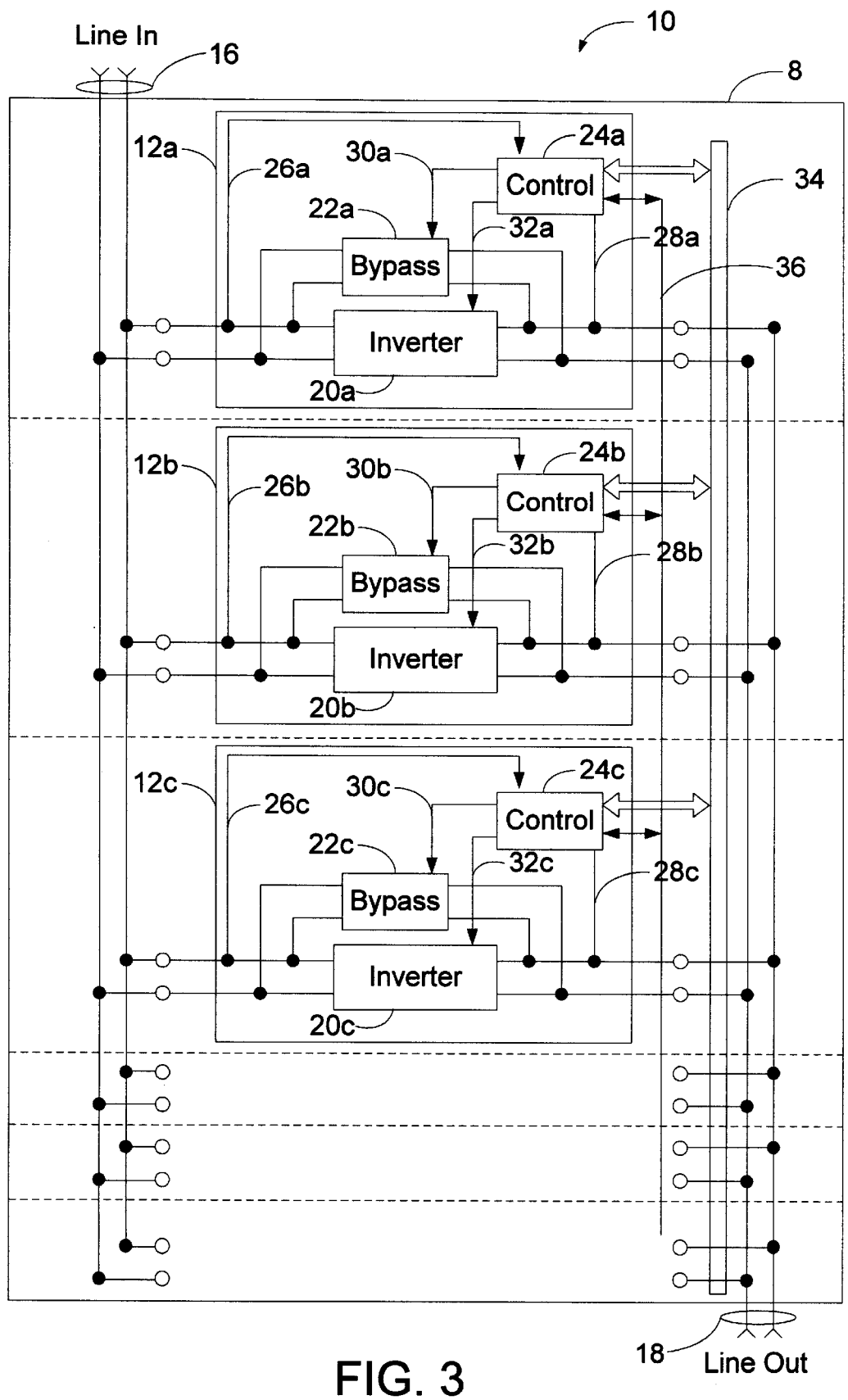
FIG. 3 is a detailed system block diagram of an embodiment of a modular uninterruptible power supply having three power modules installed for operation therein and three unfilled slots.

By including the bypass circuitry 22 and each individual power module 12 the ability to supply bypass capability in a multiple module uninterruptible power supply allows this bypass capacity to increase as the power rating of the system increases. This is accomplished by distributing the bypass functionality into each of the power modules. In this way the invention adds bypass capacity proportional to the rating of the installed power modules, and reduces the required bypass circuitry's capacity on systems with lower than maximum power requirements, thereby reducing costs on those systems as discussed above. Additionally, the system of the invention provides redundant bypass circuitry which adds to fault tolerance in the event that one of the bypass circuits should fail as may be seen from an examination of the system block diagram of FIG. 3.

As contrasted with the prior system design having a single bypass circuit for the entire modular uninterruptible power supply, the system of the invention having distributed bypass circuits within each individual power modules 12A–C can sustain the failure in one of the bypass circuits while still allowing the system to operate. The prior system illustrated in FIG. 6 is totally disabled with a single failure in the bypass circuitry should the bypass mode of operation be required. This is a particularly bad situation especially considering that the uninterruptible power supply is incorporated into a business enterprise's system so that the critical utilization equipment may be more able to operate in the case of power failures.

This redundancy and increased fault tolerance is made possible by providing multiple bypass paths between the input lines 16 and the output lines 18 through multiple bypass circuits 22A–C which are rated to carry at least two per-unit load of the inverters 20A–C. As discussed above, the selection of the rating for the bypass circuitry 22A–C allows continued operation in the bypass mode of operation under all single power module failure conditions regardless of the initial overall modular uninterruptible power supply configuration.

Each of the power modules 12A–C constructed in accordance with the teachings of the invention also contains control circuitry 24A–C. This circuitry 24$a$–$c$ controls operation of the individual power modules 12A–C as well as coordinating the operation of the individual module with that of the other modules installed in the modular uninterruptible power supply 10. This control circuitry 24A–C enables the individual power modules 12A–C to bypass the power module's inverter circuitry 20A–C. The control circuitry performs this function by sensing the input 26 and output 28 power conditions. The input from the utility on the line-in lines 16 is sensed so that the controller 24 may properly control the inverter operation, and may also switch operating modes from bypass mode (which may be employed to achieve a high energy efficiency transfer) to inverter operation in the event that the utility input power deviates from an acceptable power quality for the utilization equipment.

The output power is also sensed 28 to control operation of the power module 12. For example, the output current is sensed so that the controller may command a transition to the bypass mode of operation in the event that the utilization power requirement exceeds the capacity of the inverter 20. By going to the bypass mode of operation, the controller 24 will preserve the inverter 20, protecting the individual power switches therein from damage. Further, the controller 24 may receive user input that commands the bypass mode of operation for numerous reasons. Once a transition between the inverter and the bypass circuitry is required, the controller 24 issues commands on control lines 30 and 32 to insure proper transition between the two. Preferably, the controller 24 coordinates the transfer to preclude the paralleling of the output from each of these circuits 20, 22 while at the same time minimizing the break in power so that the utilization equipment does not sense any disruption.

The coordination of this control within the individual power modules 12A–C must also be coordinated with the operation and control of the other power modules in the modular uninterruptible power supply 10. This coordinated operation is accomplished through the inclusion of a high-speed communication bus 34 and a shared logic line 36. Generally, when one power module detects that a transition between the inverter mode of operation and the bypass mode of operation is required, its controller sends a signal to the other power modules so that their controllers can also transition from one mode to the other. In a preferred embodiment, the inverters 20A–C utilize a half bridge transformerless configuration to supply the utilization equipment. In such an embodiment, the transitioning from inverter mode to bypass mode or vice versa must be accomplished nearly simultaneously to prevent or minimize the possibility of damage to the inverter switches of any individual power module.

Additionally, beyond the transitioning between operating modes, tight synchronization of the individual power modules operation is required for the power modules 12A–C to function as a collective system. All functions, including the distributed bypass relay control as well as transitions to and from battery operation must be done nearly simultaneously on each power module in the system for optimum performance. As may well be imagined, controlling the state changes requires tight timing on the execution skew between power modules. The shared logic line or sync line 36 and the high speed communications bus 34 are used to accurately synchronize actions and events between the collection of the uninterruptible power supply modules 12A–C.

The high-speed communication bus 34 provides an excellent means of triggering actions, however microsecond synchronization of actions on multiple different processors is difficult because of the asynchronous nature of the communications. Communication latencies and interrupt delays limit the accuracy to only a few milliseconds. While such delays may be acceptable in systems utilizing ferroresonant transformer coupled outputs, such delays may be catastrophic in a transformerless system such as the embodiment illustrated in FIG. 3. By adding the common synchronization line 36 and tying it to a high level interrupt for each of the controllers 24A–C, the communication variability is removed.

Figure 4:
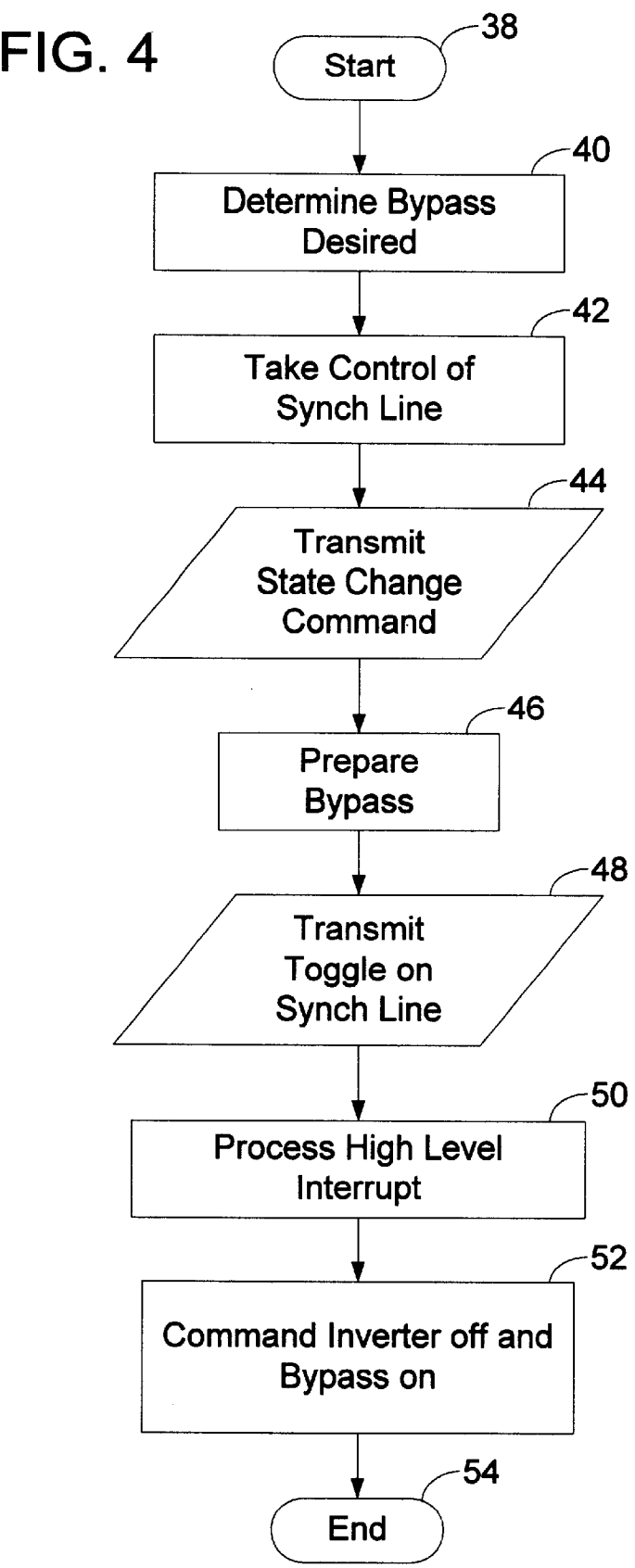
FIG. 4 is a system control flow diagram illustrating a control aspect of the invention.

FIG. 4 illustrates a control flow diagram of the procedure for synchronizing a command or event within each of the power modules 12A–C, such as a transition between inverter operation to bypass operation. Once the process begins 38 and the controller 24 determines that the bypass mode of operation is desired 40 its controller takes control 42 of the common shared sync line 36. That power module's controller then becomes the requester and transmits 44 a state change command to all of the target controllers on the high speed communications bus 34. All controllers in the modular uninterruptible power supply 10 then prepare 46 to perform the commanded action based on this state change command. However, this command is not performed until the requester controller transmits 48 a toggle on the sync line 36. The toggling of the sync line causes a high level non-maskable interrupt to execute on all of the controllers. That is, each of the controllers process the high level interrupt 50 as a result of the toggling of the sync line 36.

In the case where the state change commanded is a transition from the inverter mode of operation to the bypass mode of operation, all controllers command their inverters off and the bypass on at nearly the same time 52. As will be recognized, the toggling of the synchronization line causes the high level or non-maskable interrupt on each of the target controllers including the requesting controller. The actions across the multiple controllers for each of the multiple power modules 12A–C are all started at approximately the same time within the limits of the processor's high level interrupt handling. In a preferred embodiment of the invention, this is typically a few tens of microseconds, and in any event much tighter than the communications bus would allow if it were used independently. Once this has been accomplished the process ends 54.

Unfortunately, the communication and multiple processor control coordination delays are not the only timing problems that needed to be overcome by the system of the invention. In prior systems as discussed above and illustrated in FIG. 6, a simple mechanical relay was utilized to provide the bypass circuit functionality. However, an electromechanical relay has a finite actuation time that varies slightly as a function of various parameters, including age. However, even with the fastest electromechanical relay, the actuation times are still on the order of milliseconds, which would negate all of the advances gained by the utilization of the sync line control structure of the invention discussed above. However, the use of electromechanical relays to provide long-term bypass functionality is still desirable because of the low losses that accompany a simple mechanical switch contact. Therefore, the system of the invention utilizes a hybrid circuit to provide the bypass functionality as illustrated in FIG. 5.

Figure 5:
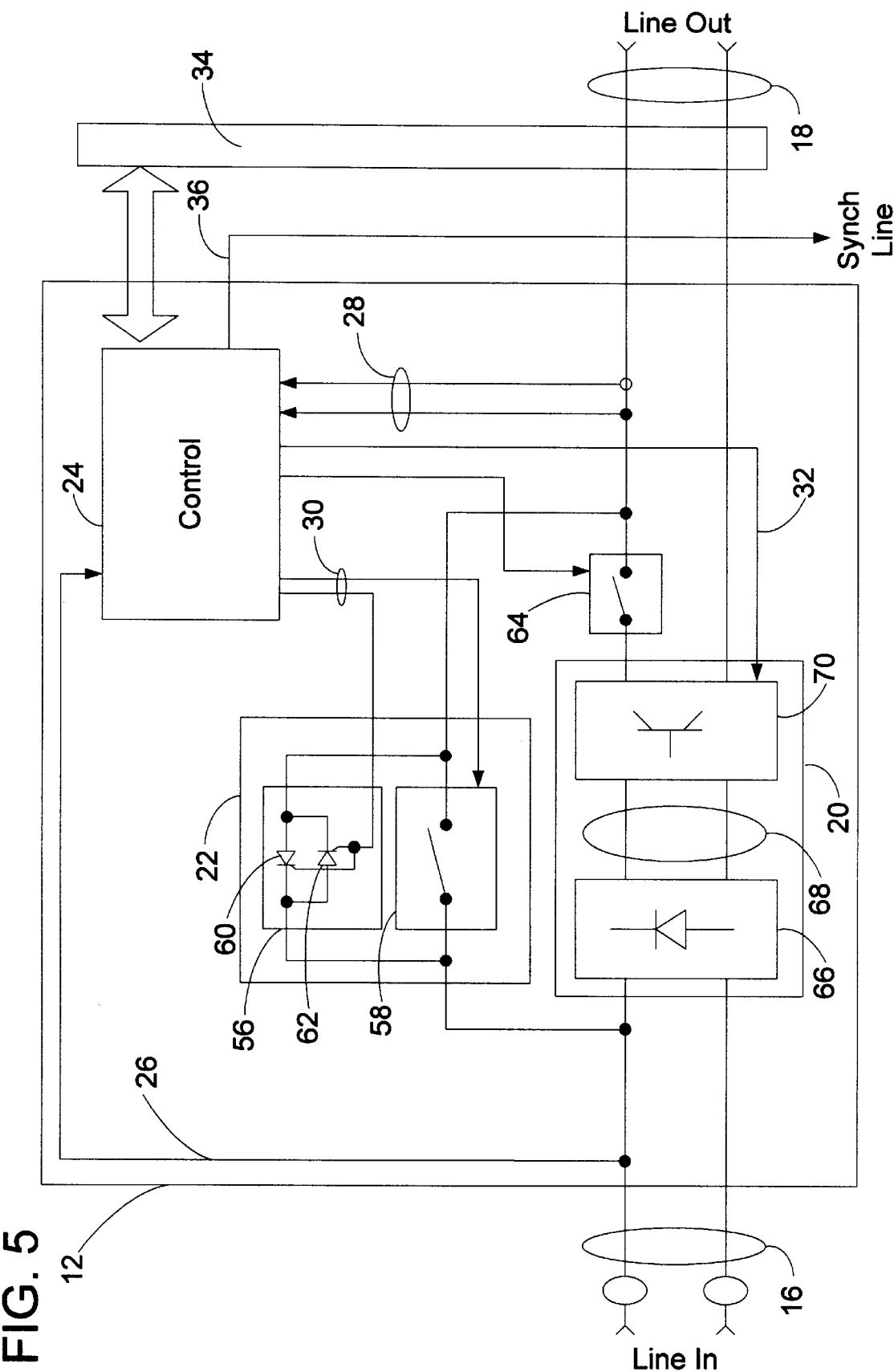
FIG. 5 is a detailed single-line block diagram of a power module having an internal bypass in accordance with the invention.

As illustrated in this FIG. 5, the bypass circuitry 22 preferably includes a solid state switching circuit 56 and an electromechanical switching circuit 58 coupled in parallel. While various configurations of a bidirectional solid state switch 56 may be utilized, a preferred embodiment of the invention incorporates back-to-back SCRs 60, 62 to provide the solid state switching functionality. As may be understood from the foregoing description, the solid state switching element is required to provide a very rapid coupling of the input power 16 to the output 18 to minimize the power disruption to the utilization equipment once the inverter 20 has been disabled. As may be further understood, the inverter is first disabled prior to enabling the bypass to ensure that the inverter is not paralleled with the utility line voltage. At the same time the solid state switching circuitry 56 is commanded on, the electromechanical relay is also commanded on. However, because of its physical inertia, the closure of this electromechanical relay 58 will take a longer period of time. Typically however the actuation of this relay 58 may be accomplished within approximately a cycle of the output to voltage waveform. Once this transition has occurred, the controller 24 may disable the solid state switching circuitry 56 to ensure that the bypass functionality is provided solely by the electromechanical relay 58. A preferred embodiment also includes an output relay 64 that may be opened by controller 24 to disconnect the inverter 20 from the output 18.

As illustrated in FIG. 5, the inverter 20 utilizes a double conversion topology whereby the input utility power online 16 are first rectified via a rectification circuit 66 to form a DC voltage on a DC link 68. This DC voltage is then supplied to the actual inverter circuitry 70. While various inverter topologies are acceptable, a preferred embodiment of the invention utilizes a half bridge topology that converts the DC voltage on the DC link 68 to an AC output to be coupled to the utilization equipment via output lines 18.

To transition from the bypass mode of operation to the inverter mode of operation, the above-described sequence of controller coordination is also performed. However, the coordination of the functional elements is somewhat different, and so will be described herein. To prepare for the nearly synchronous transition among the multiple power modules, the controller 24 first prepares for the rapid transition by enabling the solid state switching device 56. In this way power may be supplied through the solid state switching element once the electromechanical relay 58 is opened. The controller 24 also commands the output relay 64 to close and the electromechanical bypass relay 58 to open so that the system is ready for the rapid transition when so commanded.

With the bypass relay 58 open and the output relay 64 closed the system is now configured to allow the rapid transition from bypass to inverter operation once the toggle has been received on the sync line 36. Upon receipt of the high level or non-maskable interrupt, the controller 24 first disables the solid state switching device 56 and enables the operation of the inverter switches 70. In this way, once again, there is very little if any distortion seen at the output utilization equipment on line 18 even though a short break in power has resulted. This short break in power preserves the integrity of the inverter power switches 70 since they will preferably never operate in parallel with the utility power grid.

As will be recognized by those skilled in the art from the foregoing description, the system and method of the invention may be utilized in various other applications such as, for example, non-modular uninterruptible power supplies, transfer switches, line conditioners, dual source switches, etc. As with the preferred embodiment in a modular uninterruptible power supply, utilization of the teachings of the invention in these other applications adds scalability of bypass or transfer capacity with the resulting benefits discussed above.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A modular uninterruptible power supply, comprising:
   a chassis defining a plurality of slots adapted to accommodate a plurality of power modules therein, said chassis further providing input power lines and output power lines to each of said slots; and
   at least two power modules installed in two of said plurality of slots, each of said power modules including an inverter and an inverter bypass circuit coupled in parallel thereacross, each of said power modules further including a controller operably coupled to said inverter and said inverter bypass; and
   wherein said controller from each of said power modules communicate with one another to coordinate transitions between inverter operation and bypass circuit operation.

2. The modular uninterruptible power supply of claim 1, wherein said chassis further comprises a communications bus and a shared logic line among said plurality of slots, and wherein said controller in each of said power modules is operatively coupled to said communications bus and said shared logic line.

3. The modular uninterruptible power supply of claim 2, wherein one of said controllers takes control of said shared logic line, communicates state change information over said communications bus, and thereafter toggles said shared logic line to initiate a state change within each of said power modules.

4. The modular uninterruptible power supply of claim 3, wherein each of said power modules is operating in an inverter mode, and wherein each of said controllers disable operation of said inverter and thereafter enable bypass circuit operation upon detection of said toggle of said shared logic line to place each of said power modules in a bypass mode.

5. The modular uninterruptible power supply of claim 4, wherein said bypass circuit comprises a solid state switching circuit and an electromechanical switching circuit coupled in parallel, and wherein said controller commands said solid state switching circuit closed upon detection of said toggle of said shared logic line, and thereafter said controller commands said electromechanical switching element closed and said solid sate switching circuit open.

6. The modular uninterruptible power supply of claim 3, wherein each of said power modules is operating in a bypass mode, and wherein each of said controllers disable operation of said bypass circuit and thereafter enable inverter operation upon detection of said toggle of said shared logic line to place each of said power modules in an inverter mode.

7. The modular uninterruptible power supply of claim 6, wherein said bypass circuit comprises a solid state switching circuit and an electromechanical switching circuit coupled in parallel, and wherein said controller commands said solid state switching circuit closed and said electromechanical switching circuit open upon receipt of said state change information, and wherein said controller commands open said solid state switching circuit to disable operation of said bypass circuit upon detection of said toggle of said shared logic line.

8. The modular uninterruptible power supply of claim 3, wherein said toggling of said shared logic line causes said controller to execute a high level non-maskable interrupt.

9. The modular uninterruptible power supply of claim 1, wherein said bypass circuit comprises a solid state switching circuit and an electromechanical switching circuit coupled in parallel.

10. The modular uninterruptible power supply of claim 9, wherein said solid state switching circuit comprises back-to-back configured silicon controlled rectifiers (SCRs).

11. The modular uninterruptible power supply of claim 1, wherein said bypass circuit is rated to carry two times an electrical rating of said inverter.

12. The modular uninterruptible power supply of claim 1, wherein said inverter comprises a double-conversion, transformerless inverter.

13. The method of claim 2, wherein said step of executing the transition to the desired state comprises the step of:
   opening the solid state switching circuit; and
   thereafter initiating operation of the inverter.

14. A method of coordinating transitions between operating modes in a modular power supply having multiple power modules, each power module having an inverter and an inverter bypass circuit; comprising the steps of:
   communicating desired state information to the power modules;

preparing to execute a transition to the desired state;

transmitting an interrupt command;

executing the transition to the desired state.

15. The method of claim 14 wherein the bypass circuit in each of the power modules includes a solid state switching circuit and an electromechanical switching circuit, wherein the power modules are operating in a bypass mode with the electromechanical switching circuit closed, and wherein said step of preparing to execute a transition to the desired state comprises the steps of:

closing the solid state switching circuit; and opening the electromechanical switching circuit.

16. The method of claim 14, wherein the bypass circuit in each of the power modules includes a solid state switching circuit and an electromechanical switching circuit, wherein the power modules are operating in an inverter mode with the solid state switching circuit and the electromechanical switching circuit open, and wherein said step of executing the transition to the desired state comprises the steps of:

ceasing inverter operation;

thereafter closing the solid state switching circuit; and closing the electromechanical switching circuit.

17. The method of claim 16, further comprising the step of opening the solid state switching circuit after said step of closing the electromechanical switching circuit.

18. The method of claim 14, wherein said step of executing the transition to the desired state comprises the step of executing a high level non-maskable interrupt.

19. The method of claim 14, further comprising the steps of:

detecting a need for a state change; and taking control of a shared logic line.

20. A modular uninterruptible power supply, comprising a plurality of power modules coupled in parallel, each of said power modules including an inverter, a bypass circuit, and a controller operably coupled to said inverter and said bypass circuit, said controller further communicating on a communications bus and having a shared logic line coupled to each of said controllers of said power modules capable of initiating a high level interrupt in each of said controllers.

21. The modular uninterruptible power supply of claim 20, wherein each of said bypass circuits comprises a solid state switching circuit coupled in parallel with an electromechanical switching circuit.

22. The modular uninterruptible power supply of claim 21, wherein said solid state switching circuit comprises back-to-back configured silicon controlled rectifiers (SCRs).

23. The modular uninterruptible power supply of claim 20, wherein each of said bypass circuits are rated at twice an electrical rating of each of said inverters.

24. The modular uninterruptible power supply of claim 20, wherein each of said controllers is operable to command a state change between inverter mode operation and bypass mode operation of all power modules within a single gate delay by first transmitting state change information over said communications bus followed by toggling said shared logic line, said toggling initiating a high level interrupt within each of said controllers to execute said state change.

25. The modular uninterruptible power supply of claim 24, wherein each of said bypass circuits comprises a solid state switching circuit coupled in parallel with an electromechanical switching circuit, wherein each of said power modules are operating in said inverter mode, and wherein each of said controllers commands said inverters to stop operating and thereafter commands said solid state switching circuit to close in response to said toggling of said shared logic line.

26. The modular uninterruptible power supply of claim 25, wherein said controller further commands said electromechanical switching circuit closed and thereafter commands said solid state switching circuit open.

27. The modular uninterruptible power supply of claim 24, wherein each of said bypass circuits comprises a solid state switching circuit coupled in parallel with an electromechanical switching circuit, wherein each of said power modules is operating in said bypass mode, and wherein each of said controllers commands said solid state switching circuit closed and said electromechanical switching circuit open in response to said state change information, said controller further commanding said solid state switching circuit open and thereafter commands said inverters to start operating in response to said toggling of said shared logic line.

* * * * *